US007152022B1

(12) United States Patent
Joshi (10) Patent No.: US 7,152,022 B1
(45) Date of Patent: Dec. 19, 2006

(54) APPLICATION OF THE ψ-S CURVE TO ROAD GEOMETRY EXTRACTION AND MODELING

(76) Inventor: Rajashri Joshi, 1 W. Superior St., #2310, Chicago, IL (US) 60610

( * ) Notice: Subject to any disclaimer, the term of this patent is extended or adjusted under 35 U.S.C. 154(b) by 877 days.

(21) Appl. No.: 10/131,955

(22) Filed: Apr. 25, 2002

(51) Int. Cl.
*G06F 17/10* (2006.01)

(52) U.S. Cl. .......................... 703/2; 701/208
(58) Field of Classification Search .................. 703/2; 701/208
See application file for complete search history.

(56) References Cited

U.S. PATENT DOCUMENTS

| | | | |
|---|---|---|---|
| 4,144,571 | A | 3/1979 | Webber |
| 5,065,348 | A | 11/1991 | Kuragano et al. |
| 5,438,517 | A | 8/1995 | Sennott et al. |
| 5,470,233 | A | 11/1995 | Fruchterman et al. |
| 5,497,451 | A | 3/1996 | Holmes |
| 5,566,288 | A | 10/1996 | Koerhsen |
| 5,742,924 | A | 4/1998 | Nakayama |
| 6,029,173 | A | 2/2000 | Meek et al. |
| 6,088,663 | A | 7/2000 | Wang |
| 6,138,084 | A | 10/2000 | Mine |
| 6,263,089 | B1 | 7/2001 | Otsuka et al. |
| 6,438,494 | B1* | 8/2002 | Yamamoto et al. ............ 702/5 |
| 2003/0100992 | A1* | 5/2003 | Khosla ....................... 701/200 |
| 2003/0101036 | A1* | 5/2003 | Nagel ......................... 703/13 |

FOREIGN PATENT DOCUMENTS

| | | |
|---|---|---|
| EP | 0 394 517 B1 | 6/1993 |
| EP | 0 807 803 A2 | 11/1997 |
| WO | WO 95/32483 | 11/1995 |

OTHER PUBLICATIONS

Mat Jafri, Mohammad Z.; Deravi, Farzin; "Efficient algorithm for the detection of parabolic curves", 1994, Proceedings of SPIE, vol. 2356 Vision Geometry.*
Klaassen, Bernhard; Paap Karl L.; "GMD-SNAKE2: A Snake-Like Robot Driven by Wheels and a Method for Motion Control", 1999, Proceedings of the 1999 IEEE International Conference on Robotics & Automation.*
Belyaev, A.G.; Anoshkina, E.V.; Yoshizawa, S.; "Nonlinear spline generation with curve evolutions driven by curvature", Shape Modeling and Applications, 1999, Proceedings of Conference on Shape Modeling International 1999, Mar. 1-4, 1999.*
A. Scheuer et al.; "Continuous-Curvature Path Planning for Car-Like Vehicles", 1997, proceedings of the 1997 IEEE/RSJ International Conference on Intelligent Robots and Systems.*

(Continued)

*Primary Examiner*—Paul Rodriguez
*Assistant Examiner*—Russ Guill
(74) *Attorney, Agent, or Firm*—Grace L. O'Brien; Frank J. Kozak; Jon D. Shutter (57) ABSTRACT

A method for determining the line segments, circular arcs, and clothoidal arcs that form a complex curve along a length thereof is disclosed. A ψ-s curve of the complex curve is determined, which is a plot of tangent angles, wherein the angle is made with a fixed line by a tangent to the complex curve along the length thereof. The straight line portions and parabolic portions of the plot of the ψ-s curve are determined and used to determine the corresponding circular arcs and straight lines that form the complex curve and clothoidal arcs that form the complex curve, respectively. The ψ-s curve can be used to identify the curves and straight lines that define the geometry of roads and therefore can be used to store data that indicate the geometry of roads in a geographic database that contains data representing the roads.

27 Claims, 11 Drawing Sheets

OTHER PUBLICATIONS

U.S. Appl. No. 09/729,939, filed Dec. 5, 2000, entitled "Method and System for Representation of Geographic Features in a Computer-Based System".

U.S. Appl. No. 09/772,587, filed Jan. 30, 2001, entitled "Bowing Coefficient Representation of Curvature of Geographic Features".

* cited by examiner

FIG. 1B
Compound Curve

FIG. 1A
Reverse Curve

APPLICATION OF THE ψ-S CURVE TO ROAD GEOMETRY EXTRACTION AND MODELING

BACKGROUND OF THE INVENTION

The present invention relates to a method for determining the line segments, circular arcs and clothoidal arcs that form a complex curve. More particularly, the present invention relates to use of the ψ-s curve to identify the line segments, circular arcs and clothoidal arcs that define the shapes of roads.

Geographic databases have many uses. Geographic databases are used in navigation systems to display maps and provide route calculation and guidance. Geographic databases are also used by Internet sites to provide navigation-related features and services. Geographic databases are also used by advanced driver safety systems, such as adaptive headlight aiming, adaptive cruise control, and so on.

In many conventional geographic databases, a linearly extending geographic feature, such as a road, a river, or a state or municipal boundary, is represented using a series of discrete points. For example, in the case of roads, each road segment is represented by two nodes that represent the end points of the road segment, and optionally by one or more shape points that represent points along the road segment between the two nodes. Data that define each of these points (e.g., latitude, longitude, and optionally altitude) are stored in the geographic database to represent the road segment.

Although this way of representing roads and other linearly extending geographic features works well for many applications, there are other ways to represent the shapes of roads. In some parts of the world (including the United States), roads are designed to have shapes that are line segments and circular arcs connected end to end in various combinations. In some instances, clothoidal arcs are also used as transition curves to provide a continuously varying curvature segment that can join straight line segments and circular arcs, or different circular arc segments with continuity of curvature maintained at the join points. Therefore, one way to define the shape of a road is in terms of a series of connected straight line segments, circular arcs and clothoidal arcs.

If a road is to be represented as a series of connected line segments, circular arcs and clothoidal arcs, a means is needed to determine the locations at which each arc and straight line begins and ends, as well as the characterizing parameters of each primitive shape.

In addition to obtaining an accurate and space efficient representation of road geometry, it is also important for many applications to obtain accurate values of point radius of curvature of roads. Prior attempts at computing curvature of road geometry have been based on fitting a polynomial function to the shape points or by using an approximation to curvature such as the three-point method. These methods may be relatively complex and therefore relatively computationally intensive.

Accordingly, there is a need for an efficient way to determine the line segments, circular arcs and clothoidal arcs that form the shapes of roads.

SUMMARY OF THE INVENTION

To address these and other objectives, the present invention includes a method for determining the line segments, circular arcs and clothoidal arcs that form a complex curve along a length thereof. According to one embodiment, the ψ-s curve of the complex curve is determined. The ψ-s curve is a plot of tangent angles, wherein the angle of the tangent angles is made with a fixed line by a tangent to the complex curve at each point along the length thereof. The ψ-s curve is plotted against length along the curve. Straight line and parabolic portions of the plot of the ψ-s curve are determined. The straight line portions of the plot of the ψ-s curve are used to determine the corresponding circular arcs and straight line segments that form parts of the complex curve. The parabolic portions of the ψ-s curve are used to determine the corresponding clothoidal arcs that form parts of the complex curve. The ψ-s curve can be used to identify the straight line segments, circular arcs and clothoidal arcs that define the geometry of roads and therefore can be used to model the geometry of roads in a geographic database that contains data representing the roads. Furthermore, since the circular arcs identified via the ψ-s curve are completely defined by their radius, center and endpoints, and the clothoidal arcs are completely defined by their start and endpoints and the radius of curvature at the endpoints, the new representation implicitly contains point curvature information for road segments.

DETAILED DESCRIPTION OF THE PRESENTLY PREFERRED EMBODIMENTS

I. Overview

Figures 1A, 1B, 1C:
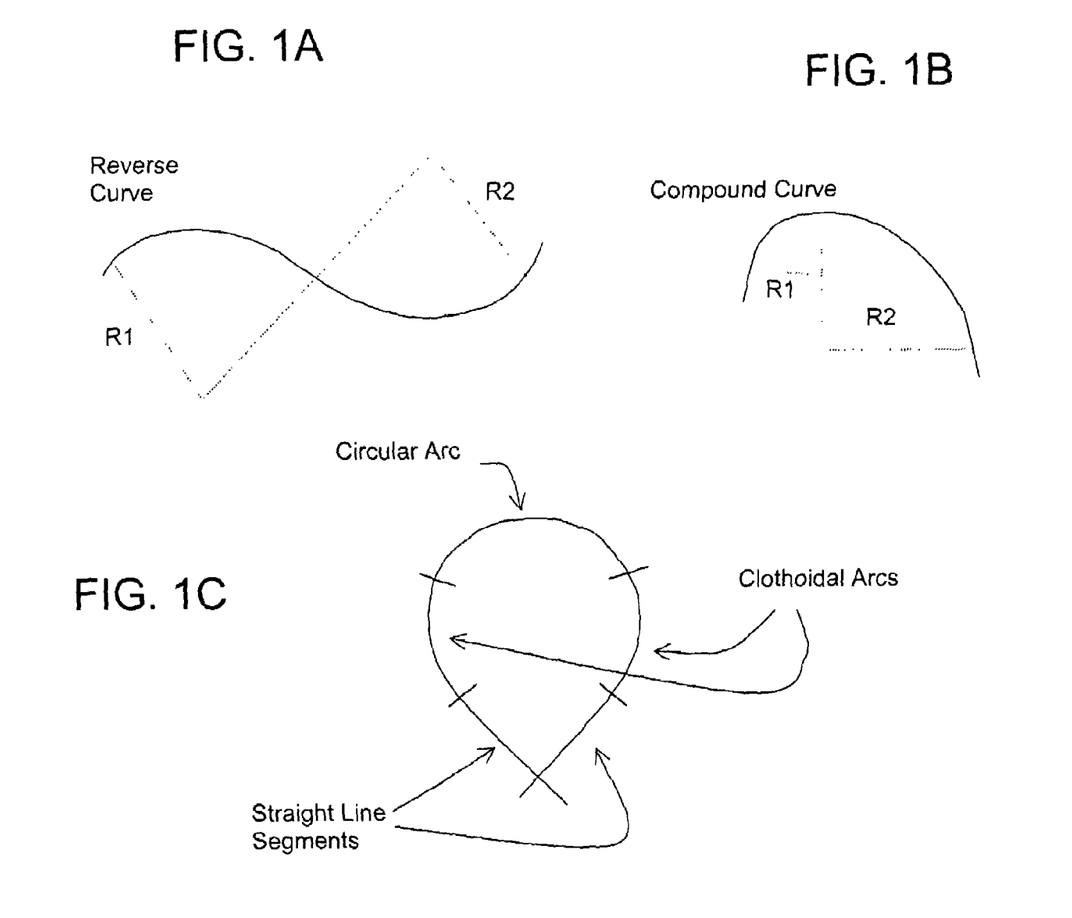
FIGS. 1A, 1B and 1C are diagrams that illustrate examples of types of curves used in road design.

In some parts of the world (including the United States), roads are designed to have shapes that are straight line segments, circular arcs and clothoidal arcs connected end to end in various combinations. FIGS. 1A and 1B show examples of such road segments.

Clothoids (also known as Cornu Spirals or Euler Spirals) are plane spiral curves with the property that the radius of curvature varies linearly with length along the curve. A clothoid is given by $$x=aC(t), y=aS(t) \qquad (1)$$

where $C(t)$ and $S(t)$ are the Fresnel integrals given in equation (2) below and are to be evaluated numerically, and $a>0$ is a scaling factor.

$$C(t) = \int_0^t \cos\left(\frac{\pi u^2}{2}\right) du, \quad S(t) = \int_0^t \sin\left(\frac{\pi u^2}{2}\right) du \qquad (2)$$

The curvature of a clothoid is given by $$\kappa = \pi s/a \qquad (3)$$

and the angle made by the tangent vector with the x-axis is given by $$\psi = \pi s^2/2 \qquad (4)$$

which is a parabolic function of arc length.

Clothoids provide a continuous transition of curvature from infinity to finite values, and are therefore used as transition curves in road design for joining straight line segments to circular arcs, or to join circular arcs together with continuity of curvature at the join points. FIG. 1C shows an example of a clothoid.

Prior attempts at computing curvature of road geometry have been based on fitting a polynomial function to the shape points or by using an approximation to curvature such as the three-point method. These methods do not take advantage of the linear-circular-clothoidal spline nature of road geometry.

Disclosed herein is a new method for computing a linear-circular-clothoidal spline model of road geometry and exploiting the piecewise linear-circular-clothoidal design of road geometry to obtain an accurate representation of the geometry and an accurate measure of radius of curvature. This method is based on the ψ-s curve.

II. The ψ-s Curve

The ψ-s curve is a plot of tangent angles, wherein the angle of the tangent angles is made with a fixed line by the tangent to the curve at each point along the curve. It is plotted against length s along the curve. Some examples follow. In these examples, the fixed line w.r.t. which all angles is measured is the x-axis, and all of ψ-s curves will be circularly shifted depending on the starting point along the shape in the x-y plane.

A. Line

Figure 2A:
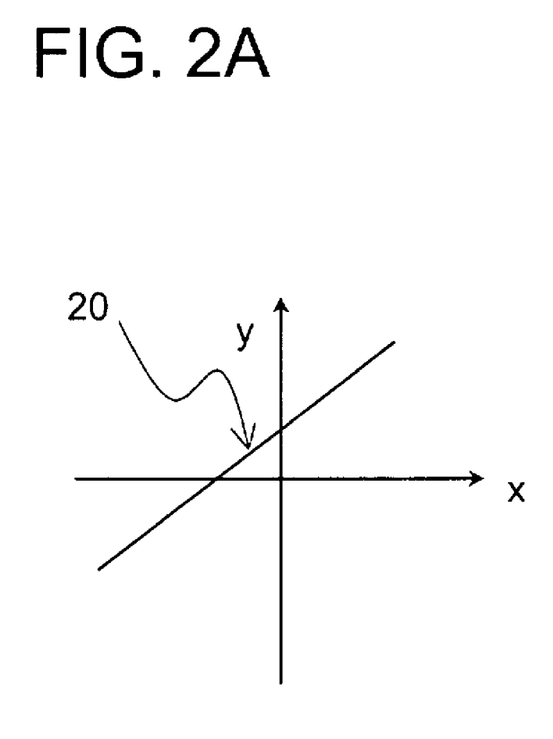
FIG. 2A shows a plot of a straight line.
Figure 2B:
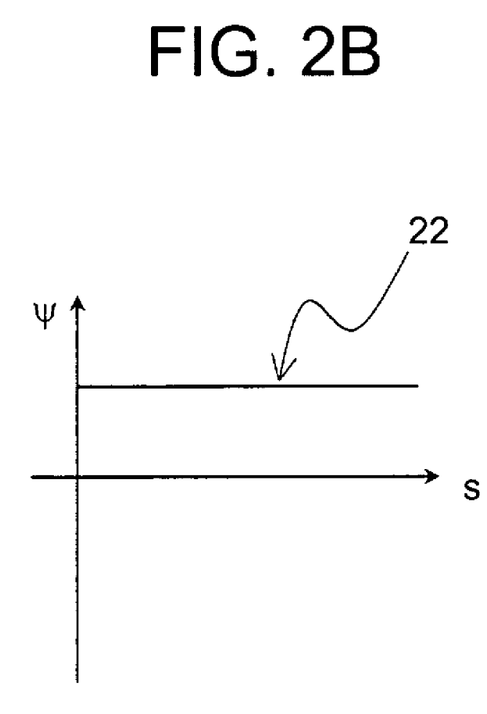
FIG. 2B shows a plot of the ψ-s curve of the line shown in FIG. 2A.

FIG. 2A shows a line 20. FIG. 2B shows a plot of the ψ-s curve 22 of the line 20. As shown in FIG. 2B, the ψ-s curve of a straight line is a line with slope equal to zero (i.e., a horizontal line), since the slope of a line is constant.

B. Circle

Figure 3A:
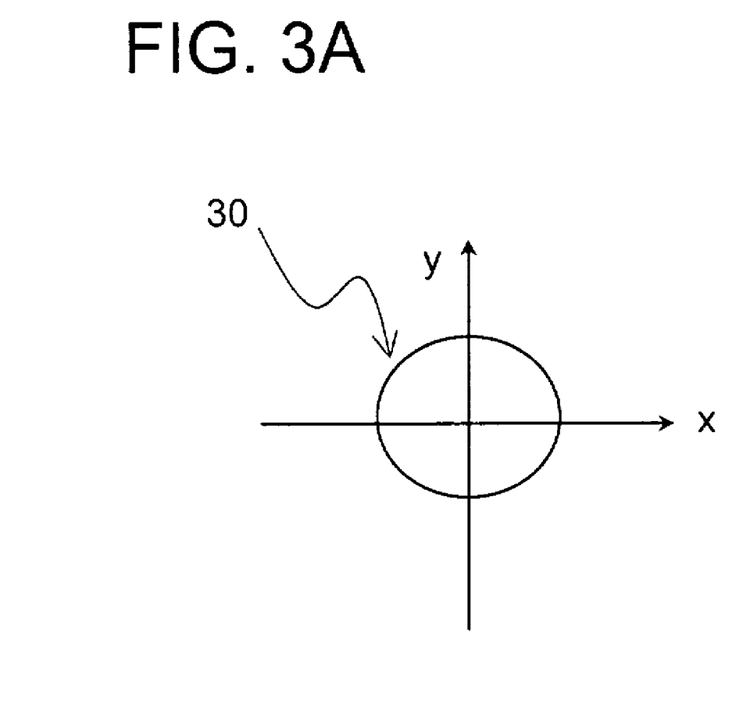
FIG. 3A shows a plot of a circle.
Figure 3B:
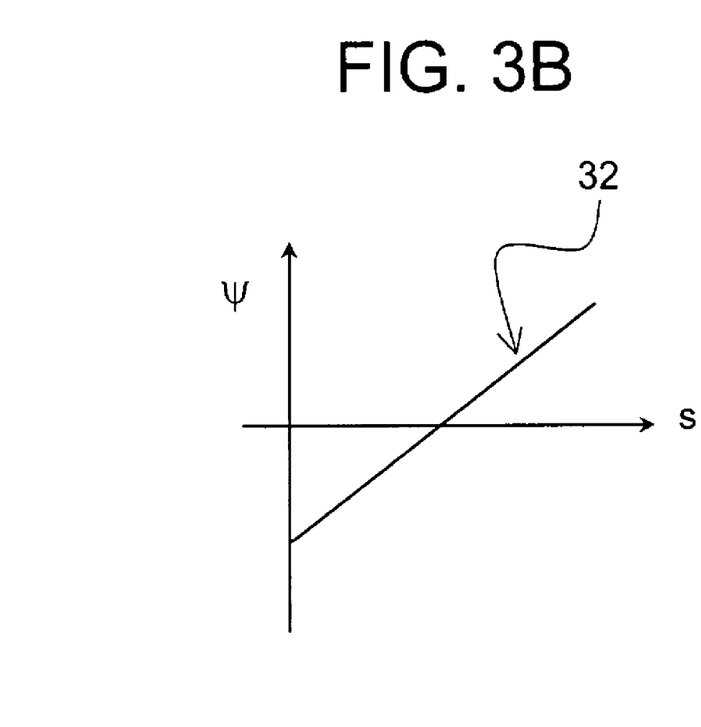
FIG. 3B shows a plot of the ψ-s curve of the circle shown in FIG. 3A.

FIG. 3A shows a circle 30 and FIG. 3B shows the ψ-s curve 32 of the circle 30. Because the angle (made with a fixed line) of the tangent to a circle changes at a constant rate (as shown in FIG. 3A), the ψ-s curve of a circle is a straight line with non-zero slope, as shown in FIG. 3B.

C. Piecewise Circular Curve

Figure 4A:
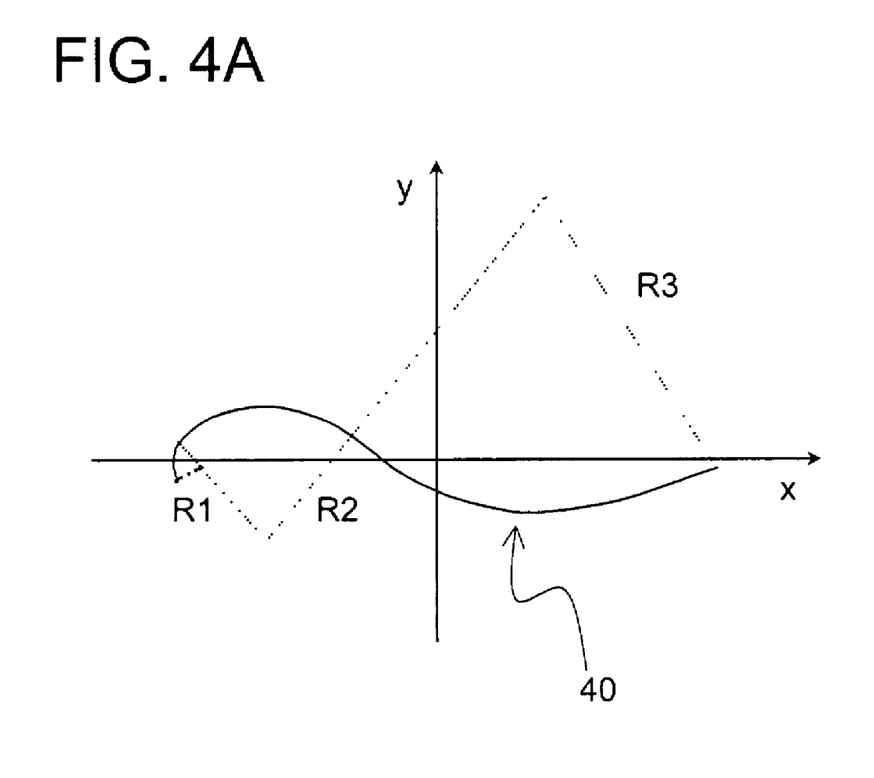
FIG. 4A shows a plot of a complex curve.
Figure 4B:
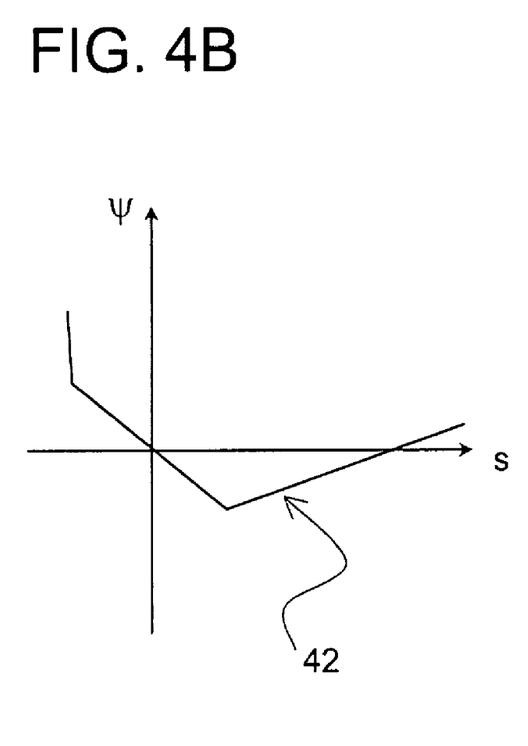
FIG. 4B shows a plot of the ψ-s curve of the complex curve shown in FIG. 4A.

FIG. 4A shows a compound curve 40. This curve 40 represents a road segment, i.e., it is piecewise circular. Specifically, the curve 40 is comprised of three circular arcs, with respective radii R1, R2, and R3, joined end to end. FIG. 4B shows the ψ-s curve 42 of the compound curve 40. It is piecewise linear.

D. Clothoidal Arc

Figure 5A:
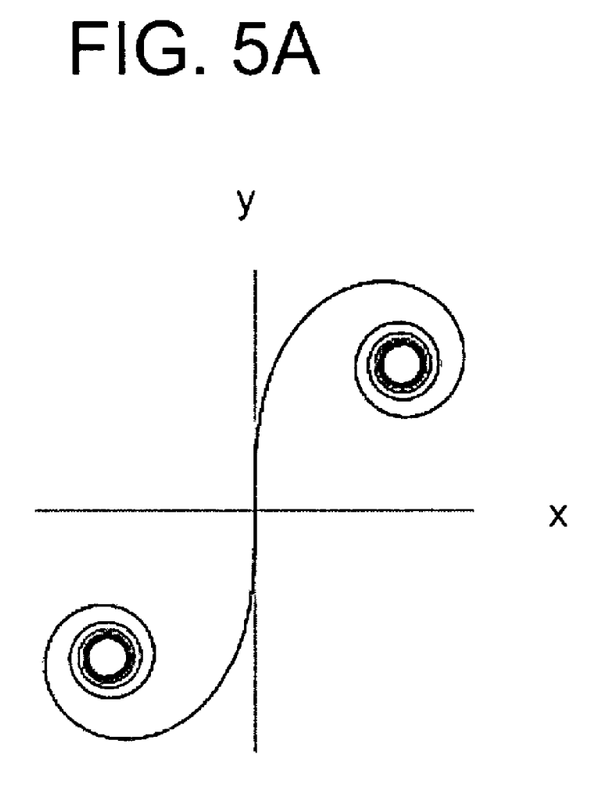
FIG. 5A shows a plot of a clothoid.
Figure 5B:
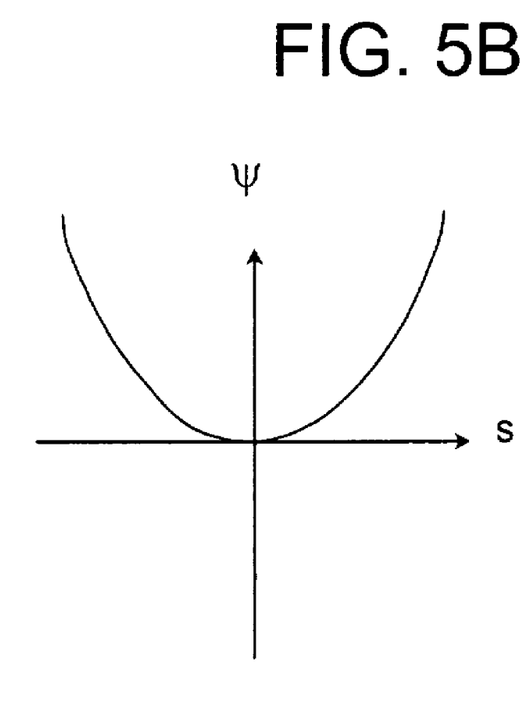
FIG. 5B shows a plot of the ψ-s curve of the clothoid shown in FIG. 5A.

FIG. 5A shows a clothoidal arc. FIG. 5B shows the corresponding ψ-s curve of the clothoidal arc in FIG. 5A. The corresponding ψ-s curve is parabolic (from equation (2)).

The ψ-s curve is an example of a signature. (For purposes of this disclosure, a signature is any 1-D function representing the 2-D boundary.) From the shape of the ψ-s curve, information about the original curve in the x-y plane can be deduced. For example, if the ψ-s curve is a horizontal line, then the corresponding shape in the x-y plane is a straight line. If the ψ-s curve is a line with nonzero slope, then the shape in the x-y plane is a circle. If the shape of the ψ-s curve is piecewise linear, then the shape in the x-y plane is piecewise circular. If the ψ-s curve is parabolic, then the shape in the x-y plane is clothoidal.

III. Application of the ψ-s Curve to Line, Circle and Clothoid Fitting of Road Geometry The ψ-s curve can be used to fit line segments, circular arcs and clothoidal arcs to a shape (e.g., the shape of a road). This can be done by fitting straight-line segments and parabolic arcs to the ψ-s curve. There are several methods for accomplishing this straight line and parabola fitting, such as curve splitting, sequential least squares, and the Line and Parabola Hough Transforms.

Because a straight line segment in the ψ-s plane corresponds to a line segment or circular arc in the x-y plane and a parabolic segment in the ψ-s plane corresponds to a clothoidal arc in the x-y plane, this method directly yields the line segments, circular arcs and clothoidal arcs that define the shape in the x-y plane. Segmentation of the ψ-s curve into straight line segments and parabolic arcs thus yields a segmentation of the shape under evaluation into straight line segments, circular arcs and parabolic arcs.

Figure 6A:
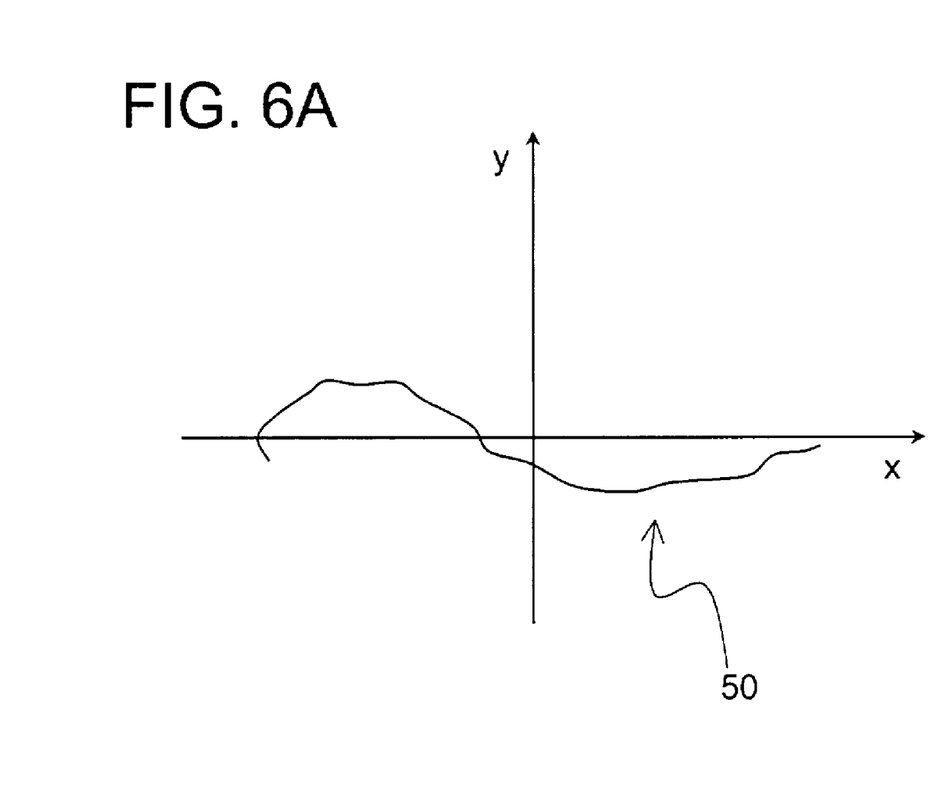
FIG. 6A shows a plot of a noisy piecewise circular curve.
Figure 6B:
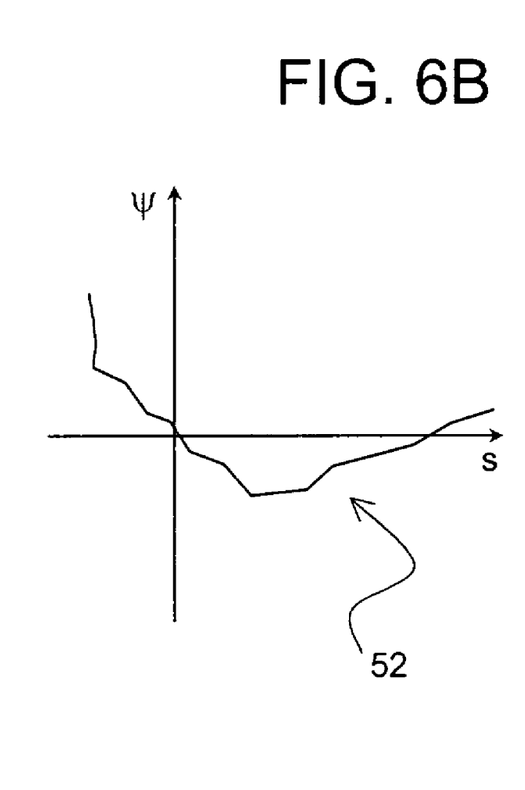
FIG. 6B shows a plot of the ψ-s curve of the noisy piecewise circular curve shown in FIG. 6A.

As an example, FIG. 6A shows a line 50. The line 50 in FIG. 6A is a noisy version of the piecewise circular curve 30 shown in FIG. 3A. Such a noisy curve may be obtained, for example, from mobile mapping vehicle data collected on some road. FIG. 6B shows the ψ-s curve 52 of the line 50. In this case, the ψ-s curve will deviate somewhat from being precisely piecewise linear.

Figure 7A:
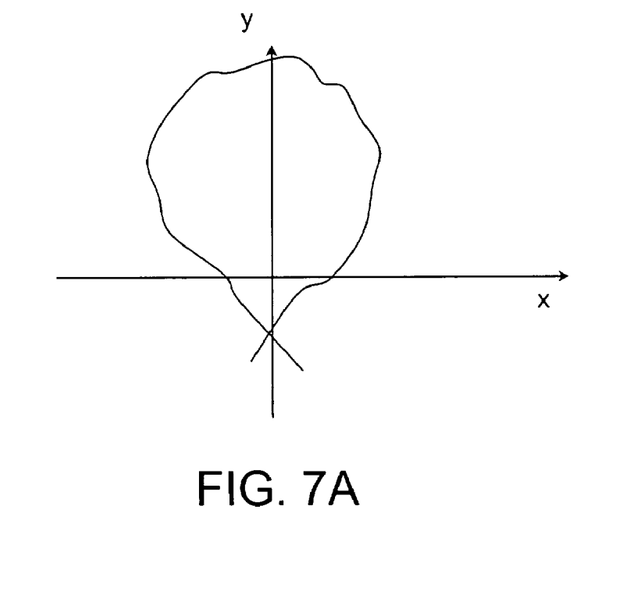
FIG. 7A shows another example of a plot of a noisy curve.
Figure 7B:
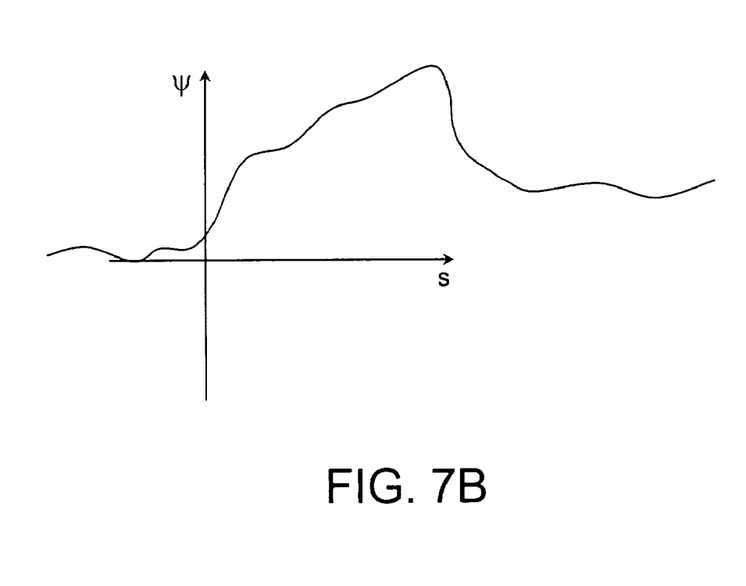
FIG. 7B shows a plot of the ψ-s curve of the noisy curve shown in FIG. 7A.

FIG. 7A shows another example of a noisy curve in the x-y plane and FIG. 7B shows the corresponding ψ-s curve.

Figures 8A, 8B:
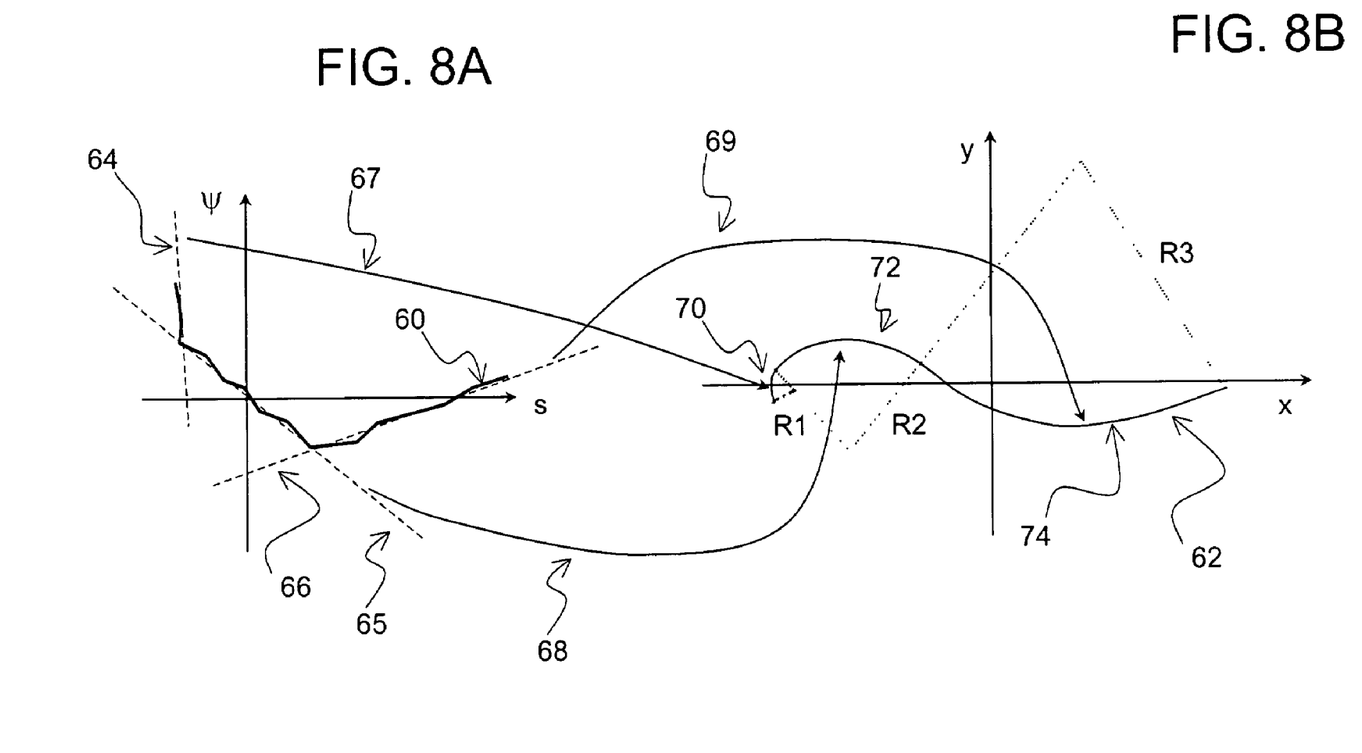
FIG. 8A shows fitting of straight lines to a plot of a ψ-s curve.
FIG. 8B shows how the straight lines of FIG. 8A are used to determine the arcs and straight lines that form a complex curve in the x-y plane.

FIGS. 8A and 8B illustrate an example in which the plot of the transform 60 of a complex curve in the ψ-s plane can be used to identify the straight lines and circular arcs that form the complex curve 62 in the x-y plane. The objective is to identify the straight lines and circular arcs which best fit the curve 62 in the x-y plane. This can be done by fitting straight lines (i.e., 64, 65, and 66) to the ψ-s curve 60 as shown in FIG. 8A. (Note that the example shown in FIG. 8A does not contain any parabolic arcs and therefore the complex curve in FIG. 8B does not contain any clothoidal arcs.)

Each straight line segment (64, 65, 66) in FIG. 8A in the ω-s plane corresponds to a circular arc (or straight line segment) in the x-y plane. This mapping is indicated in FIG. 8B. For each line segment (64, 65, 66) identified in the ψ-s plane, the arrow (i.e., 67, 68, and 69) indicates the circular arc (70, 72, and 74) in the x-y plane to which the line segment maps. Thus, by identifying these line segments (64, 65, 66) in the ψ-s plane, the curve 60 in the x-y plane is segmented into circular arcs and line segments.

Figures 9A, 9B:
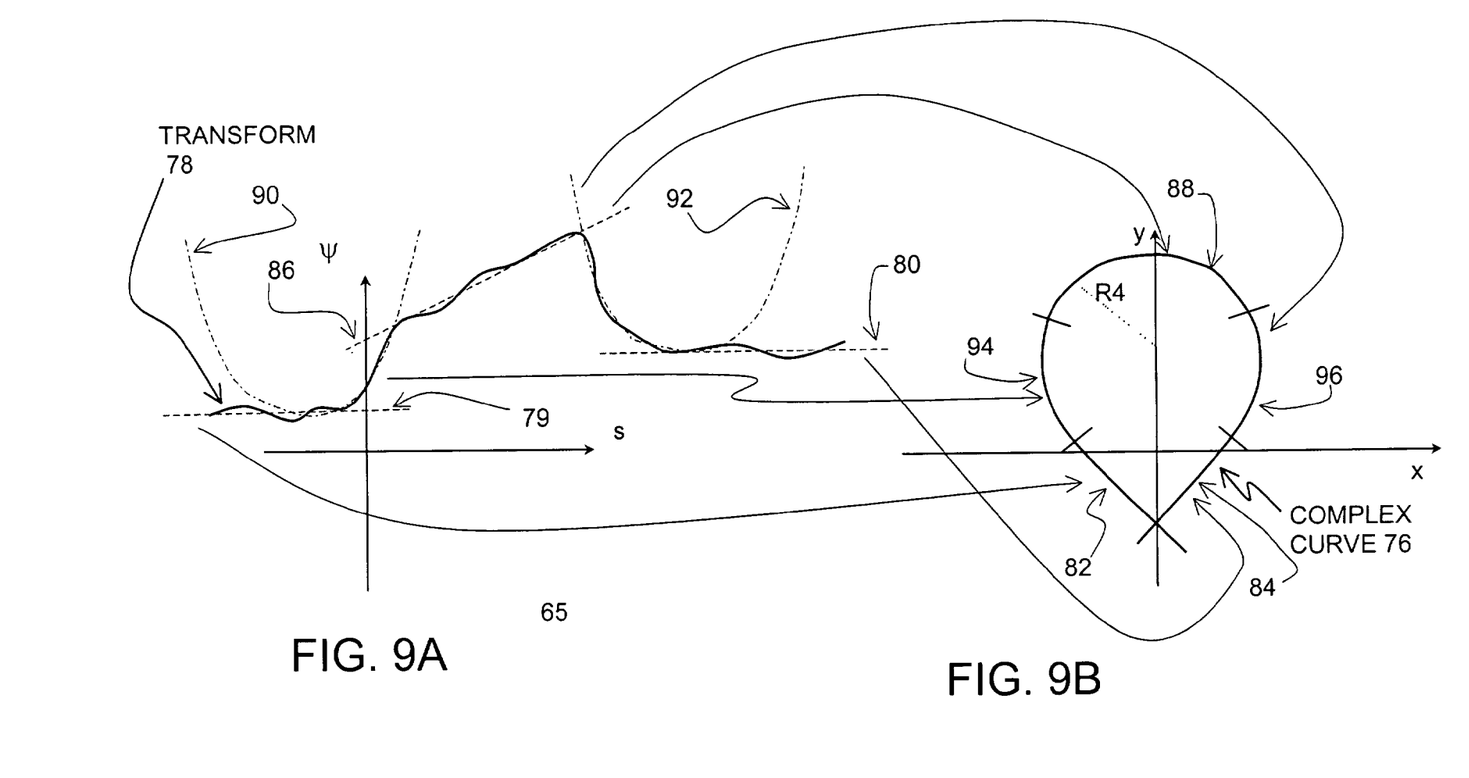
FIG. 9A shows an example in which lines and parabolas are fitted to a plot of a ψ-s curve.
FIG. 9B shows how the fitted lines and parabolas of FIG. 9A are used to determine the straight line segments, circular arcs and clothoidal arcs that form a complex curve in the x-y plane.

FIGS. 9A and 9B illustrate another example in which the plot of the transform of a complex curve in the ψ-s plane can be used to identify the straight lines, circular arcs, and clothoids that form the complex curve in the x-y plane. FIG. 9B shows a complex curve 76 and FIG. 9A shows the corresponding plot 78 of the transform of the complex curve in the ψ-s plane. Referring to FIG. 9A, the horizontal straight line segments (79, 80) in the ψ-s plane correspond to the straight line segments (82, 84) in the x-y plane. The straight line segment having a non-zero slope (86) in the ψ-s plane corresponds to the circular arc (88) in the x-y plane. The parabolic arcs (90, 92) in the ψ-s plane correspond to the clothoidal arcs (94, 96) in the x-y plane. Thus, by identifying line segments and parabolic arcs in the ψ-s plane, the curve in the x-y plane is segmented into line segments, circular arcs and clothoidal arcs.

The present method for identifying the line segments, circular arcs and clothoidal arcs that form a complex curve can be used for representing road geometry. Once the line segments, circular arcs and clothoidal arcs that form a road segment have been identified, the radius of curvature can be obtained as a by-product of the model. This can be explained as follows. Line segments have no curvature, and hence have infinite radius of curvature. Circular arcs are completely defined by their center, endpoints and radius. Hence, once the circular arcs that comprise parts of the road segment have been identified, the radius of curvature is known. Clothoidal arcs are completely identified by their endpoints and the radius values at the endpoints. One way to determine the radius at any intermediate point along the clothoidal arc is to numerically evaluate equations (1) and (2) and then use the fact that the radius of curvature varies linearly as a function of arclength. Hence, the present method can be used for computing radius of curvature of road segments.

Even if the curve in the x-y plane under consideration is not truly piecewise linear-circular-clothoidal, the method described herein can still be used to model it in terms of small linear, circular arc or clothoidal arc segments by fitting short line segments or parabolic arcs to the ψ-s curve. Therefore, the present method can be used to obtain a very general model of geometry shapes in terms of linear-circular-clothoidal arc splines.

Figure 10:
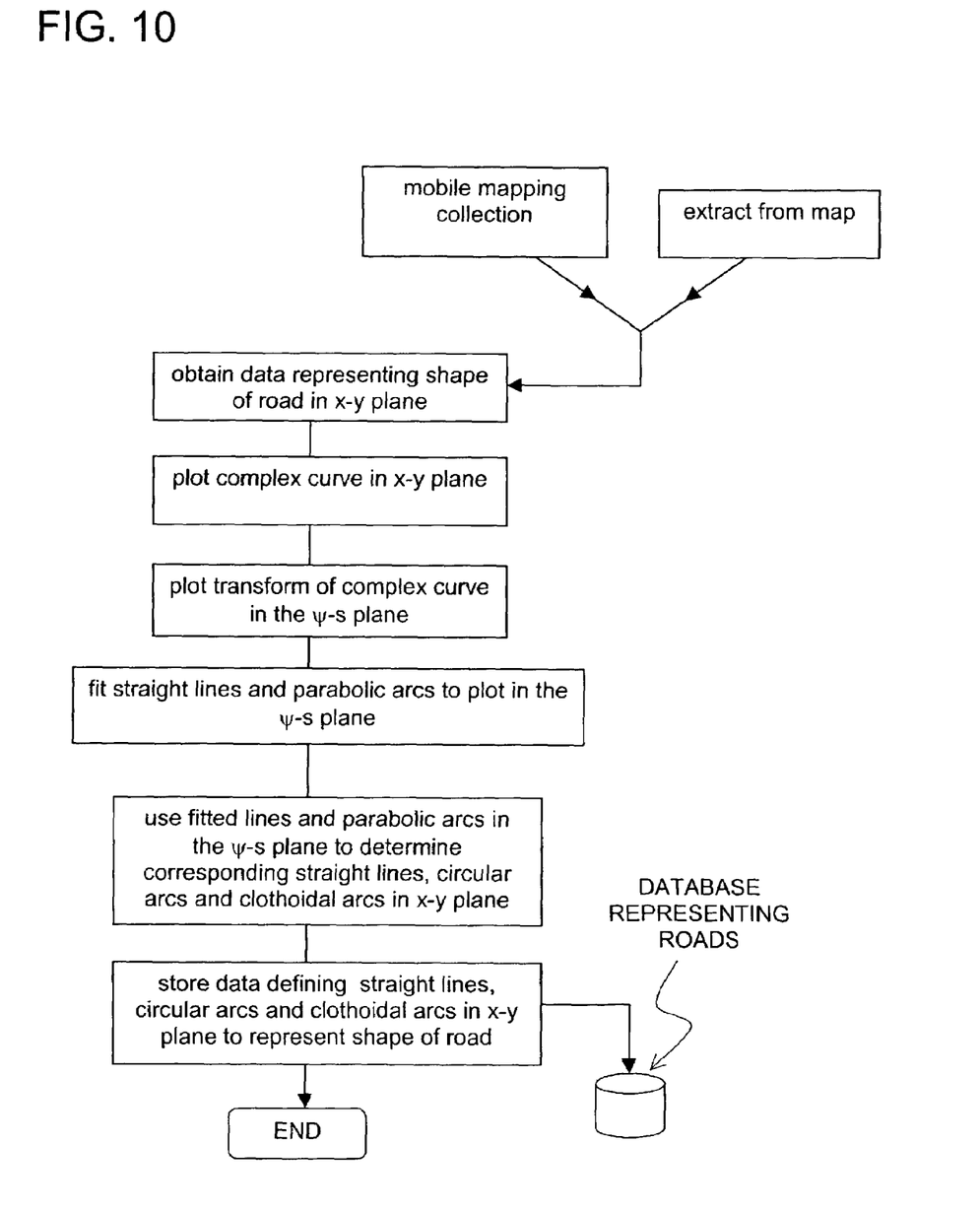
FIG. 10 is a flowchart of a process for using a plot of the ψ-s curve to determine the straight line segments, circular arcs and clothoidal arcs that define the geometry of a road.

FIG. 10 shows a flowchart of this process, wherein a plot of the ψ-s curve is formed from a complex curve in the x-y plane, straight lines and parabolas are fitted to the plot in the ψ-s plane, and then the straight lines, circular arcs and parabolic arcs that form the complex curve in the x-y plane are identified from the straight lines and parabolas in the ψ-s plane.

By representing the road in terms of the line segments, circular arcs and clothoidal arcs of which it is comprised, radius of curvature is either implicitly defined, or easily calculable with a high degree of accuracy.

Collection of Road Geometry Data Using a Mobile Mapping Vehicle.

One way to determine the shape of a road in the x-y plane is to use a vehicle (i.e., a mobile mapping vehicle) with a positioning system (e.g., GPS) that records positions as the vehicle is being driven along the road. A line connecting these positions approximates the shape of the road. When the present method is used to extract geometry from data collected from a mobile mapping vehicle, it may be necessary to shift the positions to align with the centerline of the road. There are various ways that a centerline of a road can be determined from mobile mapping vehicle data. Some methods are disclosed in U.S. Pat. No. 6,366,851, the entire disclosure of which is incorporated by reference herein.

Figure 11:
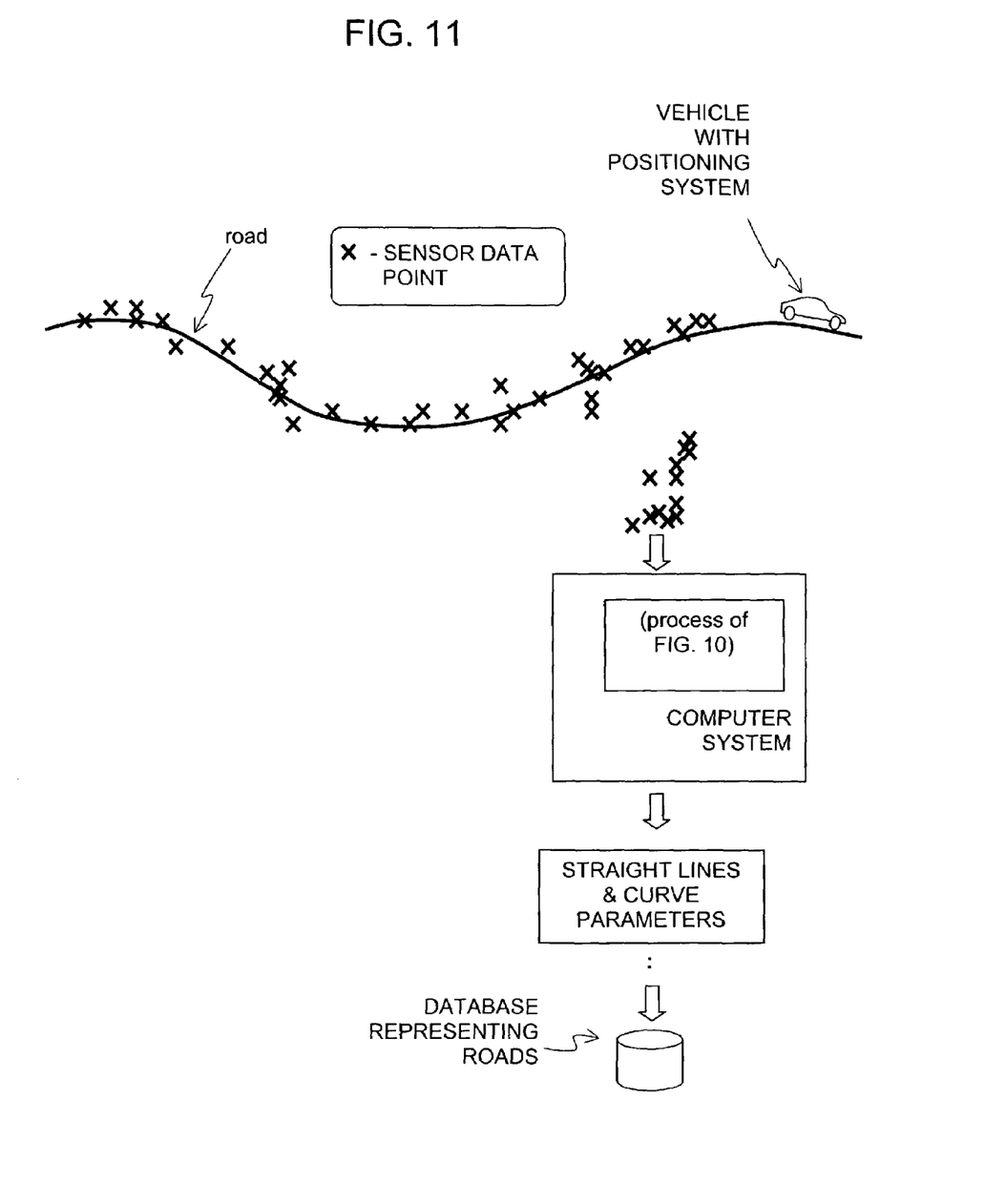
FIG. 11 is a diagram that shows how the process of FIG. 10 uses mobile mapping vehicle data to store road geometry data in a geographic database.

FIG. 11 is a diagram that illustrates a process wherein the present method uses mobile mapping data to store a representation of road geometry. The method described herein can be applied to existing map data or to new data obtained from mobile mapping vehicles to obtain a linear-circular-clothoidal spline representation of road geometry.

It is intended that the foregoing detailed description be regarded as illustrative rather than limiting and that it is understood that the following claims including all equivalents are intended to define the scope of the invention.

I claim:

1. A method of determining straight line segments, circular arcs and clothoidal arcs that form a complex curve comprising:
    providing data indicating a shape of the complex curve along a length thereof;
    forming a transform of the shape by determining an angle made with a fixed line by a tangent to the shape along the length thereof to provide a plurality of tangent angles;
    forming a plot of the tangent angles along the length of the complex curve against the length along the complex curve;
    determining straight lines that fit said plot;
    using said straight lines that fit said plot to determine at least one of the line segments and circular arcs that form the shape of the complex curve along the length thereof; and
    representing said complex curve in a geographic database by storing, in said geographic database, data that indicate the at least one of the line segments and circular arcs that form the shape of the complex curve along the length thereof.

2. The method of claim 1 wherein the complex curve represents a road segment.

3. The method of claim 1 further comprising:
    determining parabolic arcs, if any, that fit said plot; and
    using said parabolic arcs that fit said plot to determine clothoidal arcs that form the shape of the complex curve along the length thereof.

4. A method of representing geometry of a road segment in a geographic database comprising:
    providing data indicating a shape of the road segment along a length thereof;
    forming a transform of the shape by determining an angle made with a fixed line by a tangent to the shape at each point along the length to provide a plurality of tangent angles;
    forming a plot of the tangent angles at each point along the length of the road segment against the length along the road segment;
    determining straight lines that correspond to said plot;
    using the straight lines that correspond to the plot to determine at least one of line segments and circular arcs that form the shape of the road segment along the length thereof; and representing said road segment in the geographic database by storing, in said geographic database, data that indicate the line segments and circular arcs that form the shape of the road segment along the length thereof.

5. The method of claim 4 wherein the data indicating a shape of the road segment along a length thereof are obtained by extracting from photographs or maps.

6. The method of claim 4 wherein the data indicating a shape of the road segment along a length thereof are obtained using a positioning system located in a vehicle that travels along the road segment.

7. The method of claim 6 wherein said vehicle is a mobile mapping vehicle.

8. The method of claim 4 further comprising:
determining parabolic arcs, if any, that fit said plot; and
using said parabolic arcs that fit said plot to determine clothoidal arcs that form the shape of the road segment along the length thereof.

9. The method of claim 8 further comprising:
representing said road segment in the geographic database by storing, in said geographic database, data that indicate the clothoidal arcs that form the shape of the road segment along the length thereof.

10. The method of claim 9 further comprising:
determining a value of the curvature at locations along the length of the road segment using the data that indicate the line segments, circular arcs and clothoidal arcs that form the shape of the road segment along the length thereof.

11. A computer-readable medium having a geographic database formed according to process comprising:
providing data indicating a shape of a road segment along a length thereof;
forming a transform of the shape by determining an angle made with a fixed line by a tangent to the shape at each point along the length to provide a plurality of tangent angles;
forming a plot of the tangent angles at each point along the length of the road segment against the length along the road segment;
determining straight lines that correspond to said plot;
using the straight lines that correspond to the plot to determine at least one of line segments and circular arcs that form the shape of the road segment along the length thereof; and
representing said road segment in the geographic database by storing, in said geographic database, a data structure that indicates the line segments and circular arcs that form the shape of the road segment along the length thereof.

12. A process for forming a geographic database comprising:
obtaining data that represent a shape of a road;
plotting a curve that corresponds to the shape of the road;
determining a ψ-s transform of the curve, wherein the ψ-s transform is a plot of a tangent angle, wherein the angle of the tangent angle is made with a fixed line by a tangent to the curve along a length thereof;
determining straight line portions of the ψ-s transform;
using the straight line portions of the ψ-s transform to determine at least one corresponding straight lines and circular arcs that approximate the curve that corresponds to the shape of the road; and
storing data that indicate the straight lines and circular arcs that approximate the curve that corresponds to the shape of the road in order to represent the road.

13. The method of claim 12 wherein said data that represent the shape of the road are obtained by digitizing photographs or maps.

14. The method of claim 12 wherein said data that represent the shape of the road are obtained using a positioning system located in a vehicle that travels along the road.

15. The method of claim 14 wherein said vehicle is a mobile mapping vehicle.

16. The method of claim 12 further comprising:
determining parabolic arcs, if any, that fit said plot; and
using said parabolic arcs that fit said plot to determine clothoidal arcs that form the shape of the road along the length thereof.

17. The method of claim 16 wherein said data that indicate the straight lines, circular arcs and clothoidal arcs that approximate the curve that corresponds to the shape of the road are stored in the geographic database to represent said road.

18. The method of claim 17 further comprising:
determining a value of the curvature at locations along the length of the road using the data that indicate the straight lines, circular arcs and clothoidal arcs that approximate the curve that corresponds to the shape of the road; and
storing data indicating said value in said geographic database.

19. A computer-readable medium having a geographic database formed according to process comprising:
obtaining data that represent a shape of a road;
plotting a curve that corresponds to the shape of the road;
determining a ψ-s transform of the curve, wherein the ψ-s transform is plot of a tangent angle, wherein the angle of the tangent angle is made with a fixed line by a tangent to the curve along a length thereof;
determining straight line portions of the ψ-s transform;
using the straight line portions of the ψ-s transform to determine at least one corresponding straight lines and circular arcs that approximate the curve that corresponds to the shape of the road; and
storing a data structure that indicates the straight lines and circular arcs that approximate the curve that corresponds to the shape of the road in order to represent the road.

20. A method comprising:
providing data indicating a shape of a complex curve along a length thereof;
forming a transform of the shape by determining an angle made with a fixed line by a tangent to the shape along the length thereof to provide a plurality of tangent angles;
forming a plot of the tangent angles along the length of the complex curve against the length along the complex curve;
determining at least one geometrical shape that fit said plot;
using said at least one geometrical shape to determine at least one of a line, a circular arc and a clothoidal arc that form the shape of the complex curve along the length thereof; and
storing data that indicate the at least one of a line, a circular arc and a clothoidal arc that form the shape of the complex curve along the length thereof.

21. The method of claim 20, therein the at least one geometrical shape comprises any one or more selected from a group of a zero slope line that indicates the line, a nonzero slope line that indicates the circular arc, and a parabolic arc that indicates the clothoidal arc.

22. The method of claim 20, wherein the complex curve represents a road segment in a geographic database.

23. The method of claim 22, wherein the data indicating a shape of the road segment along a length thereof are obtained by any one or more selected from a group of extracting from photographs, extracting from maps, and using a positioning system located in a vehicle that travels along the road segment.

24. The method of claim 23, wherein the vehicle is a mobile mapping vehicle.

25. The method of claim 23 further comprising:
   determining a value of the curvature at locations along the length of the complex curve using the data that indicate the line, the circular arc, and the clothoidal arc that form the shape of the complex curve along the length thereof.

26. The method of claim 20 further comprising:
   representing the complex curve in a geographic database.

27. A computer-readable medium having computer-executable instructions for performing the steps of:

providing data indicating a shape of a complex curve along a length thereof;

forming a transform of the shape by determining an angle made with a fixed line by a tangent to the shape along the length thereof to provide a plurality of tangent angles;

forming a plot of the tangent angles along the length of the complex curve against the length along the complex curve;

determining at least one geometrical shape that fit said plot; and using said at least one geometrical shape to determine at least one of a line, a circular arc and a clothoidal arc that form the shape of the complex curve along the length thereof; and storing data that indicate at least one of a line, a circular arc and a clothoidal arc that form the shape of the complex curve along the length thereof.

* * * * *